United States Patent [19]

Brunson

[11] Patent Number: 4,471,475
[45] Date of Patent: Sep. 11, 1984

[54] SINGLE ELEMENT CANTILEVER MOUNTED SHEAR WAVE TRANSDUCER

[75] Inventor: Burlie A. Brunson, Slidell, La.

[73] Assignee: The United States of America as represented by the Secretary of the Navy, Washington, D.C.

[21] Appl. No.: 272,591

[22] Filed: Sep. 11, 1984

[51] Int. Cl.$^3$ ............................................. G01V 1/053
[52] U.S. Cl. ................................... 367/161; 367/162; 181/401
[58] Field of Search ............... 367/15, 161, 162, 912; 181/110, 113, 401; 175/1; 166/249

[56] References Cited

U.S. PATENT DOCUMENTS

| | | | |
|---|---|---|---|
| 2,105,011 | 1/1938 | Williams | 367/161 |
| 3,363,228 | 1/1968 | Massa | 367/161 |
| 3,489,932 | 1/1970 | Kopel et al. | 367/162 |
| 4,013,992 | 3/1977 | Dewberry et al. | 367/161 |

OTHER PUBLICATIONS

Brunson et al., "Laboratory Measurements of Shear Wave Attenuation in Saturated Sand", 11/1980, pp. 1371–1375, esp. p. 1373, Acoust. Soc. Am., vol. 68, No. 5.

Primary Examiner—Nelson Moskowitz
Attorney, Agent, or Firm—R. F. Beers; F. I. Gray

[57] ABSTRACT

A single element cantilever mounted shear wave transducer which takes advantage of the transverse vibration of a piezoceramic bimorph element mounted as a cantilever on a heavy slug. A gasket material between the slug and an inner holding tube assists in avoiding the propagation of undesirable compressional wave energy into transmission medium surrounding the transducer. Electrical isolation is achieved by wrapping the inner tube with a ground shield to which the ground wire is attached. A second layer of gasket material between the inner and an outer tube further inhibits the propagation of compressional wave energy into the transmission medium. A flexible potting compound seals the open end of the tubes including the bimorph element and serves as the active face of the transducer.

10 Claims, 2 Drawing Figures

SINGLE ELEMENT CANTILEVER MOUNTED SHEAR WAVE TRANSDUCER

BACKGROUND OF THE INVENTION

1. Field of the Invention

The present invention relates to acoustic transducers, and more particularly to a single element cantilever mounted transducer for measuring shear wave attenuation in sediments.

2. Description of the Prior Art

In oceanographic investigations it is desired to know as much as possible about the ocean environment including the characteristics of saturated sediments. Some of the sediment characteristics desired are shear wave attenuation and speed. Old measurement methods include resonant column torsion methods which have a limited frequency range. Wave propagation methods using unmounted bimorph elements encased in epoxy resin also have been used with some success, but suffer from a lack of repeatability due to transducer-to-sediment coupling sensitivity, insufficient path length due to low output of the transducers, and electrical interference which leads to an inability to determine the starting time of the arrival. Multiple element transducers have been used with some success but their sensitivity is insufficient and they are difficult to manufacture since element poling and response must be considered. Therefore, it is desired to have a shear wave transducer which provides repeatable shear wave attenuation and speed measurements in saturated sediments over appreciable transmission paths over a relatively wide frequency range such as 1 KHz to 20 KHz.

SUMMARY OF THE INVENTION

Accordingly, the present invention provides a single element cantilever mounted shear wave transducer which takes advantage of the transverse vibration of a piezoceramic bimorph element mounted as a cantilever on a heavy slug. A gasket material between the slug and an inner holding tube assists in avoiding the propagation of undesirable compressional wave energy into transmission medium surrounding the transducer. Electrical isolation is achieved by wrapping the inner tube with a ground shield to which the ground wire is attached. A second layer of gasket material between the inner and an outer tube further inhibits the propagation of compressional wave energy into the transmission medium. A flexible potting compound seals the open end of the tubes including the bimorph element and serves as the active face of the transducer.

Thus, it is an object of the present invention to provide a shear wave transducer to enable repeatable shear wave attenuation and speed measurements in saturated sediments.

Other objects, advantages and novel features of the present invention will be apparent from the following detailed description when read in conjunction with the appended claims and attached drawing.

DESCRIPTION OF THE PREFERRED EMBODIMENT

Figure 1:
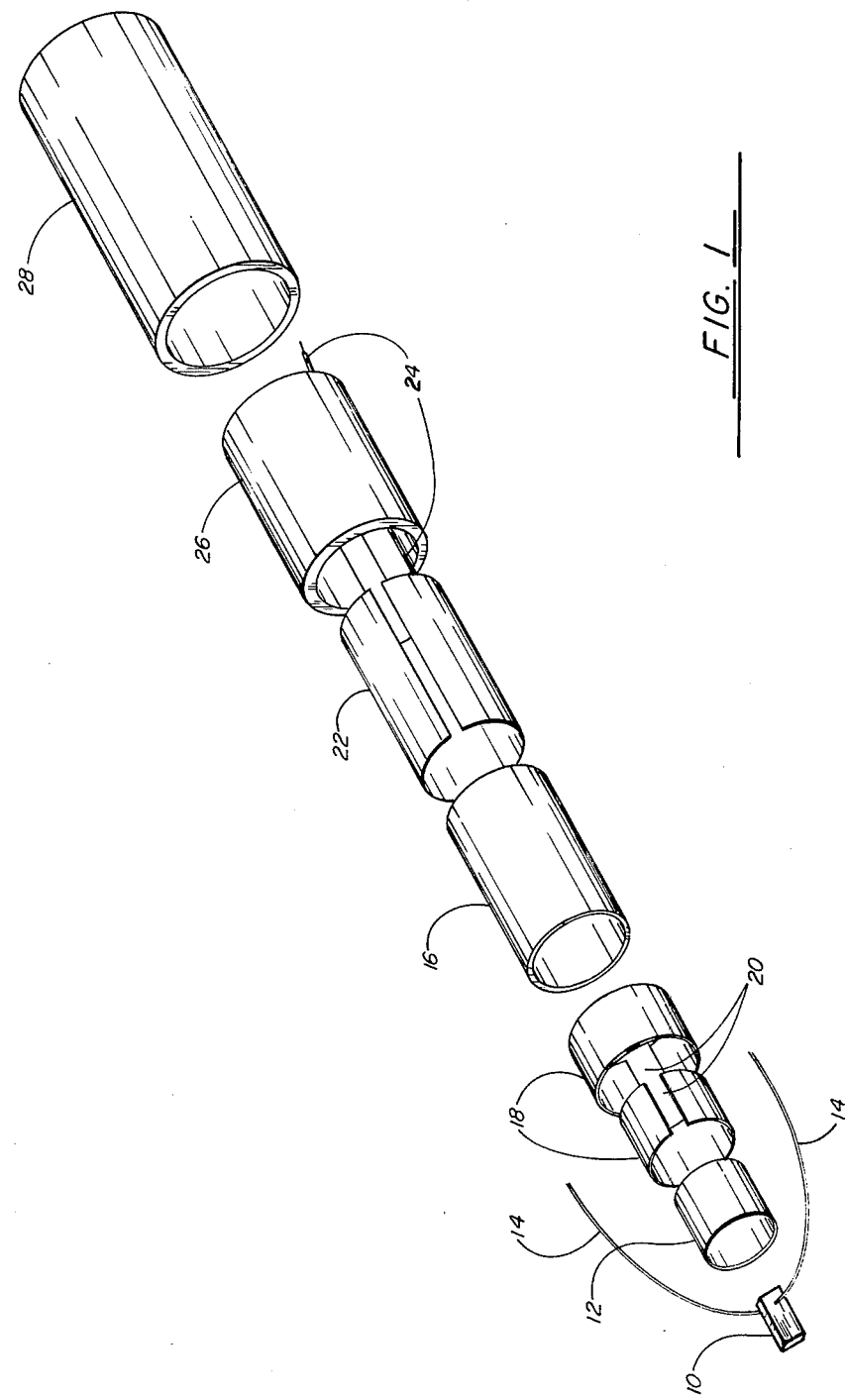
FIG. 1 is an exploded perspective view of a single element cantilever mounted shear wave transducer according to the present invevention.
Figure 2:
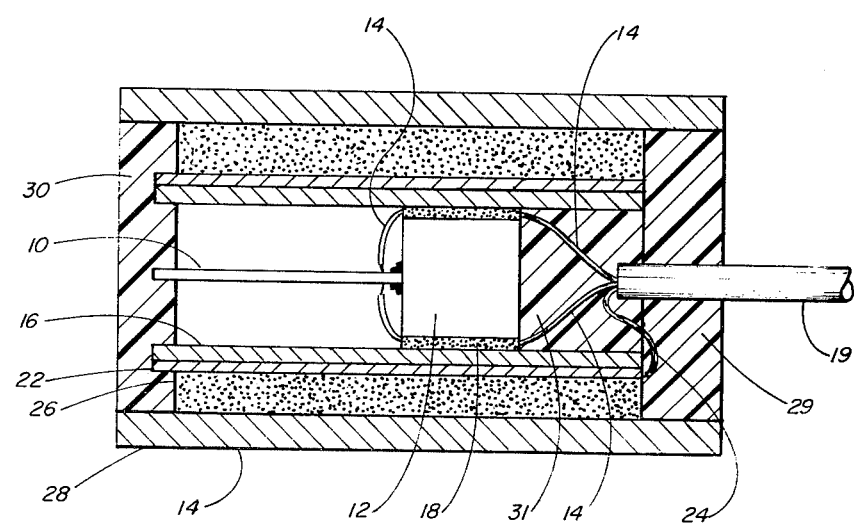
FIG. 2 is a cross-sectional view of the transducer according to the present invention.

Referring now to FIGS. 1 and 2 a single bimorph bender element 10 is mounted as a cantilever on a heavy slug 12 of a material such as brass by any suitable means such as epoxy cement. Signal leads 14 are connected to each face of the bender element 10 by suitable means such as with small low temperature solder joints. The signal leads 14 allow the impression of a voltage difference across the two faces of the bender element 10 to cause the element to flex in a plane normal to its axis, thus producing a transverse particle motion in any medium in contact with the end of the element. The slug 12 is mounted in a surrounding inner tube 16 of a non-conducting, lightweight material such as acrylic. A thin sheet of a gasket material 18 such as cork in one or more layers surrounds the slug 12 and isolates it from the inner tube 16 to assist in avoiding undesirable compressional wave energy propagation into the surrounding transmission medium. The inner tube 16 holds the mounted element 10 in place through the use of a tight fit between the gasket wrapped slug 12 and the inner wall of the tube. The signal leads 14 are passed between the element 10 and a power cable 19 through channels 20 in the gasket material 18.

Electrical isolation is achieved by wrapping the inner tube 16 with a ground shield 22 of a material such as copper foil tape and attaching the ground shield to the ground wire 24 of the power cable which is a shielded twisted pair cable. This eliminates the electrical interference, especially projector-to-receiver feedover. A second, thicker layer of gasket material 26 such as cork is placed between the inner tube 16 and an outer tube 28 over the ground shield 22. This second gasket 26 serves as added insulation to further inhibit the propagation of compressional wave energy into the surrounding transmission medium.

Although the bender element 10 could be inserted into the sediment directly, this leads to compressional wave interference. Therefore, the active face of the transducer is constructed by sealing the open end of the inner and outer tubes 16,28 with a flexible potting compound 30 such as urethane, with the bending element 10 extending well into the potting material. This bond between the bender element 10 and the potting material 30 serves as the active face of the transducer and is the source of shear waves when placed in contact with the sediment. When the potting compound 30 is cured there exists a tough flexible face suitable for coupling the transverse motion of the bender element 10 into the transmission medium. The transducer back may be sealed with the same potting compound 31 to protect the electrical leads 14 and is capped with a casting resin 29 at the back of the outer tube 28. The casting resin 29 serves to further seal the electrical connections while adding additional strength, particularly to avoid pulling the connections apart when the power cable 19 is placed in tension.

The transducer may function as a projector by transforming a voltage differential across the element faces into transverse flexure, or as a receiver by transforming the motion of the active face, and hence the bender element 10, into electrical pulses which may be displayed such as on an oscilloscope cathode ray tube. In either event direct contact of the transducer face with the transmission medium is required.

The result is a transducer with frequency response characteristics far superior to the resonant column techniques used for shear wave measurements in the past; providing for measurements over at least the 1 KHz to 20 KHz range. The flexible face and cantilever mount provide energy coupling in a manner and at an energy level which far exceeds that demonstrated by the unmounted bimorph elements. The transducer can be driven at higher input voltages thus permitting greater amplitude motions which translates to a higher source level for propagation studies. The flexible face response is more closely matched to the sediment particle motion which allows more efficient and highly repeatable coupling into the transmission medium than has been exhibited by prior techniques. The sensitivity of the cantilever mounted transducer allows motions imparted to the flexible face by particle motion in the sediment to produce relatively high electrical output for relatively small sediment particle motion. The improved sediment-to-transducer coupling allows measurements to be made in highly absorptive materials over long path lengths, a factor essential to the determination of attenuation in marine sediments.

What is claimed is:

1. A shear wave transducer comprising:
   a base having a front face and a back face;
   a bender element cantilever mounted on said front face;
   means for containing said base together with said bender element;
   means for conducting electricity in the form of a voltage differential, said conducting means being connected to the opposing faces of said bender element;
   means for inhibiting the propagation of compressional wave energy by said bender element; and
   means for electrically isolating said bender element.

2. A shear wave transducer as recited in claim 1 further comprising a face of an elastic material in which the end of said bender element is embedded, said face enclosing the front end of said containing means.

3. A shear wave transducer as recited in claims 1 or 2 wherein said containing means comprises a tube within which said base is securely contained.

4. A shear wave transducer as recited in claim 3 wherein said inhibiting means comprises a gasket between said base and said tube.

5. A shear wave transducer as recited in claim 4 wherein said electrically isolating means comprises:
   a ground plane surrounding said tube; and
   a ground wire connected to said ground plane.

6. A shear wave transducer as recited in claim 5 wherein said containing means further comprises a second tube securely containing said tube with said base.

7. A shear wave transducer as recited in claim 6 wherein said inhibiting means further comprises a second gasket between said ground plane and said second tube.

8. A shear wave transducer as recited in claim 7 wherein said conducting means comprises a pair of electrical conductors connected to the opposing faces of said bender element, said pair of electrical conductors together with said ground wire forming a shielded twisted pair cable.

9. A shear wave transducer as recited in claim 8 further comprising a plug enclosing the back end of said containing means and through which said cable extends, said plug providing additional rigidity to said transducer and preventing separation of said electrical wires from said transducer when said cable is under tension.

10. A shear wave transducer comprising:
    a cylindrical base having a front face and a back face;
    a bimorph bender element cantilever mounted on said front face;
    a first cylindrical tube within which said cylindrical base is securely contained;
    a first gasket surrounding said base between said base and said first cylindrical tube;
    a second cylindrical tube within which said first cylindrical tube is securely contained;
    a ground plane surrounding said first cylindrical tube;
    a second gasket between said ground plane and said second cylindrical tube;
    a face of an elastic material enclosing one open end of said cylindrical tube, the tip of said bender element being embedded in said face;
    a pair of electrical wires connected to opposing faces of said bimorph bender element;
    a ground wire connected to said ground plane, said ground wire together with said electrical wire pair forming a shielded twisted pair cable; and
    a back enclosing the other open end of said cylindrical tubes, said cable extending through said back.

* * * * *